United States Patent [19]

Tejada et al.

[11] Patent Number: 5,817,595
[45] Date of Patent: *Oct. 6, 1998

[54] CATALYST FOR THE HYDROISOMERIZATION OF CONTAMINATED HYDROCARBON FEEDSTOCK

[75] Inventors: Jorge Alejandro Tejada, San Antonio de los Altos; Yilda Margot Romero, La Victoria; Edito José Reyes, Los Teques, all of Venezuela

[73] Assignee: Intevep, S.A., Caracas, Venezuela

[ * ] Notice: The term of this patent shall not extend beyond the expiration date of Pat. No. 5,612,273.

[21] Appl. No.: 656,762

[22] Filed: Jun. 3, 1996

Related U.S. Application Data

[63] Continuation-in-part of Ser. No. 367,405, Dec. 30, 1994.
[51] Int. Cl.⁶ .................................. B01J 23/00
[52] U.S. Cl. ..................... 502/313; 502/314; 502/315; 502/316
[58] Field of Search ................... 502/313, 314, 502/315, 316

[56] References Cited

U.S. PATENT DOCUMENTS

| | | | |
|---|---|---|---|
| 5,169,614 | 12/1992 | Chang et al. | 423/705 |
| 5,182,242 | 1/1993 | Marler | 502/66 |
| 5,316,656 | 5/1994 | Pellet et al. | 208/120 |
| 5,612,273 | 3/1997 | Prada et al. | 502/313 |

*Primary Examiner*—Glenn Caldarola
*Assistant Examiner*—Thuan D. Dang
*Attorney, Agent, or Firm*—Bachman & LaPointe, PC

[57] ABSTRACT

A catalyst system for treating sulfur and nitrogen contaminated hydrocarbon feedstock includes a matrix, at least one support medium substantially uniformly distributed through said matrix and comprising a silica alumina molecular sieve material having a composition $xSiO_2:Al_2O_3:yP_2O_5$, wherein x is at least about 0.1, a first catalytically active metal phase supported on said support medium, said first catalytically active metal phase comprising a first metal and a second metal each selected from group VIII of the Periodic Table of Elements, said first metal being different from said second metal, a second catalytically active metal phase supported on said matrix, said second catalytically active metal phase comprising a third metal and a fourth metal each selected from group VIII of the Periodic Table of Elements and a fifth metal selected from group VIb of the Periodic Table of Elements, said third metal being different from said fourth metal.

49 Claims, 1 Drawing Sheet

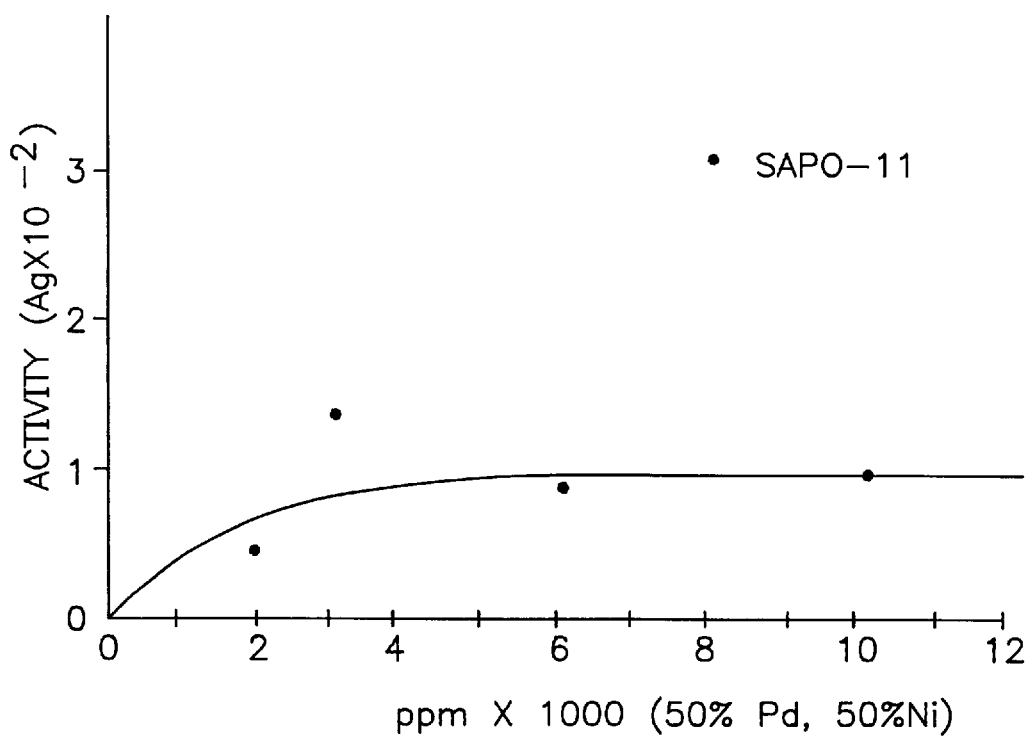

CATALYST FOR THE HYDROISOMERIZATION OF CONTAMINATED HYDROCARBON FEEDSTOCK

CROSS-REFERENCE TO RELATED APPLICATION

This application is a Continuation-In-Part of U.S. patent application Ser. No. 08/367,405, filed Dec. 30, 1994.

BACKGROUND OF THE INVENTION

The invention relates to a catalyst for hydroisomerization of sulfur and nitrogen contaminated hydrocarbon feedstocks, as well as a method for preparing the catalyst and a hydroisomerization process using the catalyst.

A persistent problem in the field of hydrocarbon processing and refining is the treatment of hydrocarbon feedstocks which are contaminated with sulfur and nitrogen. Sulfur and nitrogen contaminants tend to rapidly deactivate process catalysts and, furthermore, are undesirable fractions in the final product.

Numerous disclosures have been made proposing solutions to the sulfur and nitrogen contamination problem. Known processes include multi-stage treatments, severe limitations on the upper level of sulfur and nitrogen contaminants in the feedstock, and limited ability to remove sulfur and nitrogen from the process product. There thus still remains the need for a catalyst system for treatment, especially by hydroisomerization, of sulfur and nitrogen contaminated feedstock.

Further, hydroisomerization catalysts typically include one or more catalytically active metals which result in additional cost. It is therefore desirable to provide a catalyst system which is effective with reduced amounts of active metals.

It is therefore the primary object of the present invention to provide a catalyst system for hydroisomerization of a sulfur and nitrogen contaminated feedstock which is not rapidly poisoned by the contaminants in the feedstock.

It is a further object of the present invention to provide a catalyst system for treating a sulfur and nitrogen contaminated feedstock which serves to reduce the level of sulfur and nitrogen in the feedstock.

It is a still further object of the present invention to provide a catalyst system effective in treating a wide variety of hydrocarbon feedstocks using a reduced amount of catalytically active metal(s) so as to provide increased fractions of isomers in the final product.

It is another object of the present invention to provide a method for preparing a catalyst system according to the present invention.

It is still another object of the present invention to provide a hydroisomerization process using the catalyst system of the present invention for treating sulfur and nitrogen contaminated feedstocks.

Other objects and advantages of the present invention will appear hereinbelow.

SUMMARY OF THE INVENTION

In accordance with the foregoing, a catalyst system is provided having excellent hydrodesulfurization (HDS) and hydrodenitrification (HDN) properties as well as excellent activity toward a hydroisomerization function. A process is also provided in accordance with the invention for preparing the catalyst system of the present invention. Further, a hydroisomerization process is provided which uses the catalyst system of the present invention for treating a sulfur and nitrogen contaminated hydrocarbon feedstock.

In accordance with the invention, a catalyst system is provided comprising a matrix; at least one support medium substantially uniformly distributed through said matrix and comprising a silica alumina molecular sieve material having a composition $xSiO_2:Al_2O_3:yP_2O_5$ wherein x is at least about 0.1; a first catalytically active metal phase supported on said support medium, said first catalytically active metal phase comprising a first metal and a second metal each selected from group VIII of the Periodic Table of Elements, said first metal being different from said second metal; a second catalytically active metal phase supported on said matrix, said second catalytically active metal phase comprising a third metal and a fourth metal each selected from group VIII of the Periodic Table of Elements and a fifth metal selected from group VIB of the Periodic Table of Elements, said third metal being different from said fourth metal.

In further accordance with the invention, a method is provided for preparing a catalyst system in accordance with the invention which method comprises the steps of providing a matrix material; providing at least one support medium comprising a silica alumina molecular sieve material having a composition $xSiO_2:Al_2O_3:yP_2O_5$ wherein x is at least about 0.1; impregnating said support medium with a first metal and a second metal each selected from group VIII of the Periodic Table of Elements so as to provide an impregnated support medium, said first metal being different from said second metal; mixing said impregnated support medium with said matrix so as to provide a substantially uniform heterogeneous mixture of said matrix and said impregnated support medium; forming said mixture into catalyst elements; impregnating said catalyst elements with a metal selected from group VIB of the Periodic Table of Elements; impregnating said catalyst elements with a third metal and a fourth metal each selected from group VIII of the Periodic Table of Elements so as to provide impregnated catalyst elements, said third metal being different from said fourth metal; drying and calcining said impregnated catalyst elements so as to provide said catalyst system having a surface area of between about 200 $m^2/g$ to about 500 $m^2/g$ and a mechanical resistance of between about 4 $kg/cm^2$ to about 9 $kg/cm^2$.

Additionally, a process for hydroisomerization of a sulfur and nitrogen contaminated hydrocarbon feedstock is provided in accordance with the invention which process comprises the steps of providing a hydrocarbon feedstock having an initial sulfur content of up to about 10,000 ppm and an initial nitrogen content of up to about 200 ppm; providing a catalyst system comprising a matrix; at least one support medium substantially uniformly distributed through said matrix and comprising a silica alumina molecular sieve material having a composition $xSiO_2:Al_2O_3:yP_2O_5$ wherein x is at least about 0.1; a first catalytically active metal phase supported on said support medium, said first catalytically active metal phase comprising a first metal and a second metal each selected from group VIII of the Periodic Table of Elements, said first metal being different from said second metal; a second catalytically active metal phase supported on said matrix, said second catalytically active metal phase comprising a third metal and a fourth metal each selected from group VIII of the Periodic Table of Elements and a fifth metal selected from group VIB of the Periodic Table of Elements, said third metal being different from said fourth metal; and contacting said feedstock with said catalyst system under a hydrogen atmosphere and at hydroisomerization conditions so as to provide a final product having a final sulfur content and final nitrogen content which are less than said initial sulfur content and said initial nitrogen content.

BRIEF DESCRIPTION OF THE DRAWINGS

A detailed description of the preferred embodiments of the invention follows with reference to the attached FIGURE which illustrates the isomerization of n-octane for various concentrations of active metals in accordance with the present invention.

DETAILED DESCRIPTION

The invention relates to a catalyst system for treating sulfur and nitrogen contaminated hydrocarbon feedstocks. According to the invention, a catalyst system is provided which has excellent activity towards hydroisomerization reactions, enhanced hydrodesulfurization (HDS) and hydrodenitrification (HDN) capabilities, and enhanced resistance to poisoning or deactivation by sulfur and nitrogen contaminants in the feedstock to be treated.

According to the invention, the catalyst system comprises a matrix material supporting at least one and preferably two support media which are substantially uniformly distributed through the matrix. A first catalytically active metal phase is supported on the support medium, and a second catalytically active metal phase is supported on the matrix.

According to the invention, the matrix is preferably a catalytically active material preferably selected from the group consisting of alumina, silica alumina, titanium alumina and mixtures thereof. The preferred matrix material is gamma alumina, preferably having a surface area of between about 200 m$^2$/g to about 400 m$^2$/g, and having a pore volume of between about 0.3 cc/g to about 0.9 cc/g.

The support media of the catalyst system of the present invention are preferably molecular sieve materials such as zeolites and the like.

According to one embodiment of the invention, the catalyst system of the present invention may include two different zeolites as a support medium, wherein each zeolite has a different average pore size. In further accordance with the invention, the first support medium preferably comprises a molecular sieve or zeolite composition having an average pore size of between about 5 Å to about 6 Å, a Si/Al ratio of between about 10 to about 300, a surface area greater than or equal to about 300 m$^2$/g and a crystal size of less than or equal to about 2 microns, while the second support medium also preferably comprises a molecular sieve or zeolite material having an average pore size of between about 7 Å to about 8 Å, a Si/Al ratio of between about 3 to about 100, a surface area of greater than or equal to about 600 m$^2$/g and a crystal size of less than or equal to about 1 micron.

The first zeolite having the smaller average pore size is preferably selected in accordance with the invention from the group consisting of SAPO-type zeolites, and SAPO-11 has been found particularly suitable for use according to the invention. The second zeolite having the larger average pore size of between about 7 Å to about 8 Å is preferably selected in accordance with the invention from the group consisting of beta zeolite, ZSM-20, Y zeolite, SAPO-type zeolites and mixtures thereof. SAPO-type zeolites are also preferred in accordance with this embodiment of the invention, and SAPO-37, SAPO-5 and mixtures thereof have been found to be particularly suitable.

The smaller and larger pore size zeolite are most preferably present in the catalyst system in a weight ratio of the first or small pore size zeolite to the second or large pore size zeolite of between about 0.2 to about 0.8. Further, the total support media and matrix material are preferably present in a ratio by weight of support medium to matrix of between about 0.1 to about 0.6, more preferably between about 0.1 to about 0.4.

It has been found in accordance with the invention that a catalyst containing two different zeolite materials having close but different pore sizes serves to enhance the activity of the catalyst toward the desired hydroisomerization reaction. This effect is believed to be due to the fact that smaller linear molecules will be isomerized in the smaller pore zeolite while branched molecules will have limited access to the smaller pore zeolite and will migrate to the larger pore size zeolite where they are isomerized further, thus resulting in an increase in the number of branched molecules. A particularly suitable mixture of first and second zeolites has been found in accordance with the invention to be a mixture containing SAPO-type and beta zeolite, and SAPO-11 mixed with beta zeolite has been found particularly useful in accordance with the invention.

It has also been found in accordance with the invention that the activity of the catalyst is still further enhanced when the different zeolite support media are in close or intimate intermixed relationship with each other, rather than a mere mechanical mixture. Thus, in accordance with the invention, both first and second zeolite support media are preferably substantially uniformly distributed through the matrix of the catalyst system so as to provide a catalyst system having further enhanced hydroisomerization activity.

In accordance with the invention, the first and second catalytically active metal phases supported in the catalyst system of the present invention have been found to further enhance the activity of the catalyst toward the desired hydroisomerization reaction while helping to enhance the HDS (sulfur removing) and HDN (nitrogen removing) properties of the catalyst. According to the invention, the first catalytically active metal phase which is supported on the zeolite preferably comprises at least a first and a second metal selected from Group VIII of the Periodic Table of Elements. The first and second metal are preferably different from each other. Further, the first metal is preferably selected from the group consisting of nickel, cobalt, iron and mixtures thereof, while the second metal is preferably selected from the group consisting of palladium, platinum, ruthenium, rhodium and mixtures thereof. A particularly suitable combination of first and second metal in accordance with the invention is nickel and palladium.

According to the invention, the first metal and second metal present in the catalytically active metal phase which is supported on the zeolite are preferably present in a weight ratio of first metal to second metal of between about 1:0.2 to about 4:1, more preferably between about 1:1 to about 4:1. Further, the second metal is preferably present in the catalytically active metal phase supported on the zeolite in an amount of between about 0.025% to about 1.0% by weight of the zeolite support medium.

The second catalytically active metal phase which is supported on the matrix preferably also comprises two metals selected from Group VIII of the Periodic Table of Elements. The two metals, referred to herein as the third and fourth metal of the catalyst system, are preferably different from each other. The third metal is preferably selected from the group consisting of nickel, cobalt, iron and mixtures thereof while the fourth metal is selected from the group consisting of palladium, platinum, ruthenium, rhodium and mixtures thereof.

The second catalytically active metal phase supported on the matrix also preferably includes a fifth metal which is selected from Group VIB of the Periodic Table of Elements. The fifth metal is preferably selected from the group consisting of tungsten, molybdenum and mixtures thereof, most preferably tungsten.

The third and fourth metals are preferably present in the second catalytically active metal phase supported on the matrix in a weight ratio of third metal to fourth metal of between about 1:0.2 to about 4:1, more preferably between about 1:1 to about 4:1. Further, the fourth metal is preferably present in the second catalytically active metal phase supported on the matrix in an amount of between about 0.025% to about 1.0% by weight of the matrix. As with the first catalytically active metal phase, nickel and palladium have been found to be particularly suitable for the third and fourth metal in accordance with the present invention.

The fifth metal is preferably present in the second catalytically active metal phase supported on the matrix in an amount of between about 6% to about 30% by weight of the matrix. In accordance with the invention, it has been found that the catalyst system according to the present invention may also suitably include a Group VIb metal in the first catalytically active metal phase supported on the zeolite. This additional Group VIb metal may be the same or different from the Group VIb metal which is supported on the matrix.

The catalyst system according to the present invention is characterized by a surface area greater than or equal to about 200 m$^2$/g, preferably between about 200 m$^2$/g to about 500 m$^2$/g, more preferably between about 250 m$^2$/g to about 450 m$^2$/g, and an average pore diameter of between about 30 Å to about 80 Å. Further, the catalyst system according to the invention has been found desirably to have a mechanical resistance of between about 4 kg/cm$^2$ to about 9 kg/cm$^2$.

In accordance with the present invention, it has been found that excellent results are obtained using silica alumina molecular sieve material as the support medium, especially when the silica alumina molecular sieve material has a composition $xSiO_2:Al_2O_3:yP_2O_5$ wherein x is at least about 0.1, and more preferably wherein x is between about 0.1 to about 0.6 and y is between about 1.0 to about 0.9. Particularly suitable molecular sieve materials according to the invention include SAPO-type materials, preferably selected from the group consisting of SAPO-11, SAPO-37, SAPO-5 and mixtures thereof. The provision of a support medium as described in accordance with the invention advantageously provides a catalyst system having excellent activity with respect to sulfur and nitrogen removal as well as excellent activity in the desired hydroisomerization reactions.

In further accordance with this embodiment of the invention, SAPO-type silica alumina molecular sieves as described above advantageously serve to allow the preparation of a catalyst system having a ratio of support to matrix of between about 0.1 to about 0.6, a ratio of first metal to second metal in the first and second catalytically active metal phase such that first and second metal are present in a weight ratio of first metal to second metal of between about 1:0.2 to about 4:1, and a mechanical resistance of between about 5 kg/cm$^2$ to about 13 kg/cm$^2$.

In accordance with the invention, it has been found that the use of a SAPO-type support medium having a composition as described above, especially SAPO-11, SAPO-37 and SAPO-5, provides excellent activity with respect to hydroisomerization and removal of sulfur and nitrogen with smaller amounts of catalytically active metal. In accordance with the invention, it has been found that the SAPO-type support media provides a catalyst system well suited to the desired reactions while using a relatively smaller amount of active metal, preferably between about 1,000 to about 10,000 parts per million based upon the total weight of support medium in the catalyst system.

It should be noted that a number of silica alumina molecular sieve materials are available and useful as the support medium in the catalyst system of the present invention. However, as set forth above, SAPO-11, SAPO-37, SAPO-5 and mixtures thereof are particularly preferred.

As set forth above, the catalyst system in accordance with the invention exhibits excellent hydroisomerization activity as well as improved HDS and HDN properties and resistance to poisoning or deactivation from sulfur and nitrogen.

In further accordance with the invention, the catalyst system of the present invention may be prepared as follows.

Initially, the desired matrix material is provided, preferably having an average particle size of less than or equal to about 45 μm. The provided matrix material may suitably be selected from the group consisting of alumina, silica alumina, titanium alumina and mixtures thereof, most preferably gamma alumina. The matrix material so provided preferably has a surface area between about 200 m$^2$/g to about 400 m$^2$/g and a pore volume of between about 0.3 cc/g to about 0.9 cc/g.

The desired support medium is also provided, preferably including two different SAPO-type zeolite compositions having different but closely related average pore size as described above. The different zeolite materials are preferably impregnated with the desired metals of the first catalytically active metal phase in the desired concentrations. The different zeolites are preferably impregnated separately but with the same concentrations of metals. The actual impregnation step may be carried out in accordance with any of numerous conventional processes known to one skilled in the art. Further, each metal may be impregnated separately or simultaneously, for example in a coimpregnation step. In accordance with the invention, one particularly suitable impregnation technique is to impregnate the zeolite with a salt solution of the desired metal, particularly where the metal salt is a water soluble metal salt preferably selected from the group consisting of acetates, nitrates, oxalates, chlorides and mixtures thereof. Ion exchange techniques are also suitable in accordance with the invention.

The impregnated zeolite may suitably then be dried, preferably at a temperature of less than or equal to about 150° C.

In accordance with the invention, the impregnated and dried zeolites are then mixed so as to provide a substantially uniform mixture. In accordance with the method of the present invention, the mixing step may preferably be carried out by mixing the zeolite mixture with a binder material and subsequently extruding the binder/zeolite mixture so as to provide extrudates or extruded zeolite elements wherein the different zeolites are in intimate contact with one another as desired in accordance with the present invention. Suitable binder materials include acetic acid, glycolic acid and mixtures thereof. The binder may suitably be mixed with the zeolite mixture at a ratio by weight of zeolite mixture to binder of between about 20 to about 100. The zeolite mixture is preferably extruded so as to provide extruded elements having a particle size less than or equal to about 110 microns.

In further accordance with the invention, the extruded impregnated zeolite may then be dried, preferably at a temperature of less than or equal to about 150° C. and mixed with the matrix material so as to provide a substantially uniform mixture. The zeolite mixture and matrix are preferably mixed in a ratio by weight of zeolite to matrix of between about 0.1 to about 0.4. Further, the zeolite mixture itself is preferably composed of smaller and larger pore size zeolite in a ratio by weight of smaller pore size zeolite to larger pore size zeolite of between about 0.2 to about 0.8.

The zeolite/matrix mixture is then preferably formed into catalyst elements in accordance with the invention, most preferably by extrusion, so as to provide extruded catalyst elements. The extruded catalyst elements are then preferably dried at room temperature, for example overnight, so as to provide dried extruded catalyst elements. The dried extruded catalyst elements are then preferably calcined by gradually increasing the temperature to which the catalyst elements are subjected in a stepwise manner to a temperature of between about 420° C. to about 520° C. so as to provide calcined catalyst elements. For example, the catalyst elements may be calcined by increasing the temperature at a rate of about 3° C. per minute to various temperature levels which are maintained for desired periods of time such as, for example, 80° C. for three hours, 120° C. for three hours, 250° C. for three hours, 350° C. for one hour and 450° C. for four hours.

In accordance with the method of the present invention, the calcined catalyst elements are then impregnated with the Group VIb metal so as to provide the desired weight percent of Group VIb metal relative to the matrix material. As with the first catalytically active metal phase, the Group VIb metal may be incorporated into the catalyst system through any known technique such as impregnation, ion exchange, and the like. Impregnation may be carried out by impregnating the catalyst elements with a solution containing one or more salts of the desired metal. As set forth above, desired salts include water soluble metal salts selected from the group consisting of acetates, nitrates, oxalates, chlorides and mixtures thereof.

After impregnation with the Group VIb metal, the catalyst elements are preferably dried again at a temperature preferably less than or equal to about 150° C. so as to provide dried and partially impregnated catalyst elements.

In accordance with the invention, the catalyst elements are then preferably further impregnated with the second catalytically active metal phase comprising the third and fourth metals selected from Group VIII of the Periodic Table of Elements. The two selected metals, preferably nickel and palladium, may be sequentially or simultaneously impregnated as desired. Impregnation, if used, may be carried out using aqueous solutions of metal salts wherein the salts are preferably water soluble salts selected from the group consisting of acetates, nitrates, oxalates, chlorides and mixtures thereof. At this point, the catalyst elements in accordance with the invention are fully impregnated or provided with the first catalytically active metal phase supported on the zeolite support medium and the second catalytically active metal phase supported on the matrix. The Group VIb metal is also at this point impregnated on the matrix and may be partially supported on the zeolite support medium as well.

In further accordance with the method of the present invention, the fully impregnated catalyst elements are then dried at a temperature preferably less than or equal to about 130° C. so as to provide dried fully impregnated catalyst elements which are then calcined by gradually increasing the temperature to which the catalyst elements are subjected in a stepwise manner to a temperature of between about 420° C. to about 520° C. The catalyst elements of the catalyst system so provided preferably have a surface area of between about 200 $m^2/g$ to about 500 $m^2/g$ and a mechanical resistance of between about 7 $kg/cm^2$ to about 13 $kg/cm^2$.

As set forth above, it has also been found in accordance with the invention that the provision of asupport medium in accordance with the invention having a composition $xSiO_2:Al_2O_3:yP_2O_5$, wherein x is at least about 0.1, and preferably between about 0.1 to about 0.6, and wherein y is between about 1.0 to about 0.9, provides a catalyst system wherein reduced amounts of catalytically active metal are required to obtain the desired hydroisomerization and sulfur and nitrogen removal as desired. In accordance with this embodiment, it is preferable to provide the catalyst system with catalytically active metal as set forth above wherein the first catalytically active metal phase and second catalytically active metal phase combined are present in the catalyst system in an amount between about 500 ppm to about 7000 ppm based upon the weight of the catalyst system. This is advantageous in that reducing the required amount of catalytically active metal greatly reduces the overall cost of the catalyst system as desired in accordance with the invention.

Thus provided in accordance with the present invention is a method for preparing the catalyst system according to the present invention which has excellent activity toward hydroisomerization of a wide variety of hydrocarbon feedstocks, and which has excellent HDS and HDN properties.

Further, according to a preferred embodiment of the invention, the different zeolites of the support medium are intimately mixed which has been found in accordance with the invention to provide a synergistic effect in hydroisomerization as will be demonstrated in the examples set forth below.

In further accordance with the invention, a process is provided for treating a sulfur and nitrogen contaminated hydrocarbon feedstock so as to increase the fraction of isomers in the final product, and to provide final sulfur and nitrogen content in the product which is lower than the initial sulfur and nitrogen content of the feedstock.

In accordance with the process of the present invention, suitable hydrocarbon feedstocks include but are not limited to $C_5$–$C_{60}$ hydrocarbon feedstocks, lube stock base feedstocks which are rich in paraffins, heavy cracked naphtha, heavy straight run naphtha, virgin heavy naphtha, virgin light naphtha, diesel, medium mineral oil, hydrocracked medium mineral oil, slack wax, deasphalted oil, hydrocracked deasphalted oil, refined spindle oil, light mineral oil, refined light mineral oil, bright stock oil, refined bright stock oil, and mixtures thereof, as well as numerous others. In further accordance with the invention, the process according to the present invention using the catalyst system as described above also provides a final product desirably having a higher viscosity index and a lower pour point than the hydrocarbon feedstock.

In accordance with the process of the present invention, the feedstock to be treated preferably has a sulfur content of up to about 10,000 ppm and a nitrogen content of up to about 200 ppm. It should be appreciated that the contaminant levels of the aforedescribed feedstock are much greater than those which are handled by conventional hydroisomerization catalysts.

In further accordance with the process of the present invention, the hydrocarbon feedstock to be treated is contacted with a catalyst system according to the invention under a hydrogen atmosphere and at hydroisomerization conditions so as to provide the desired final product having increased isomer content and reduced sulfur and nitrogen content, as well as improved viscosity index and pour point values.

The hydroisomerization conditions to be used in accordance with the present invention will of course vary depending upon the exact catalyst and feedstock to be used and the final product which is desired.

For example, in hydroisomerization process treating a lube base feedstock, the catalyst may suitably be preheated so as to activate same at a temperature of about 120° C. under a nitrogen atmosphere at a pressure of one atmosphere for approximately four hours. The reactor may be fed with a further activating feedstock such as dimethyldisulfate in gas oil, for example at a temperature of about 120° C. at one atmosphere for two hours, prior to initiation of the process. A reaction mixture of hydrogen and hydrocarbon feedstock may then be fed to the reactor followed by stepwise increase in reactor temperature until an operation temperature preferably between about 340° C. to about 380° C. is attained.

In accordance with the process of the present invention, a final product is provided which has significantly reduced levels of sulfur and nitrogen, and increased fractions of isomers as well as improved flow or pour point and viscosity index.

The following examples further illustrate the preparation and use of the catalyst system according to the invention.

EXAMPLE 1

This example illustrates the preparation of a catalyst according to the present invention. A SAPO-11 zeolite was coimpregnated with nickel and palladium using an aqueous solution of Ni[Ni(NO$_3$)$_2$.6H$_2$O] and [Pd(NO$_3$)$_2$.H$_2$O] so as to provide the zeolite with 1000 ppm of nickel and 1000 ppm of palladium based on the weight of the zeolite. The SAPO-11 composition was 0.12 SiO$_2$:Al$_2$O$_3$:P$_2$O$_5$. The zeolite was then dried at 100° C. to provide an impregnated catalyst as set forth in Table 1 below.

TABLE 1

| Sieve | Surf. Area BET m$^2$/g | Pore Vol. cc/g | Pore diameter Å |
|---|---|---|---|
| SAPO-11 | 200–220 | 0.30–0.38 | 70–75 |

The impregnated zeolite was mixed with gamma alumina having a particle size of 45 microns so as to provide a uniform mixture. 2.5% v/v of acetic acid was added to the zeolite/alumina mixture so as to provide an extrudable paste, which was extruded to provide extrudate samples having a particle size of about 1/16". The extruded zeolite/alumina sample was dried at room temperature overnight and then calcined by gradually increasing the temperature at a rate of 3° C. per minute, to 80° C. for three hours, 120° C. for three hours, 250° C. for three hours, 350° C. for one hour and 450° C. for four hours. The calcined extrudate was then impregnated with an aqueous ammonium metatungstanate solution so as to incorporate 20% weight of WO$_3$ into the extruded zeolite/alumina catalyst elements. The tungsten impregnated catalyst elements were dried at 100° C. and subsequently coimpregnated with nickel and palladium cations using an aqueous solution of Ni[Ni(NO$_3$)$_2$.6H$_2$O] and [Pd(NO$_3$)$_2$.H$_2$O] so as to incorporate nickel and palladium into the matrix material at a concentration of 1000 ppm of nickel and 1000 ppm of palladium and to thereby provide a catalyst system according to the invention.

EXAMPLE 2

This example demonstrates the effect of varying the metal concentration in the molecular sieve on the activity of catalysts according to the invention. A catalyst was prepared according to the procedure of Example 1, using SAPO-11 having a composition 0.12 SiO$_2$:Al$_2$O$_3$:P$_2$O$_5$. The catalysts were prepared in accordance with the procedure of Example 1 and were impregnated with different concentrations of Pd and Ni as set forth below in Table 2.

TABLE 2

| SAPO-11 | ppm – Pd | ppm – Ni |
|---|---|---|
| G | 1000 | 1000 |
| H | 1500 | 1500 |
| I | 3000 | 3000 |
| J | 5000 | 5000 |

The catalysts were tested for conversion of n-octane at a feed flow rate of 1 ml/hour, with a hydrogen flow of 27 cc/min and at a temperature of 320° C. The attached FIGURE shows the results of these conversions. As shown in the FIGURE, best results were attained at total metal concentrations of 1500 ppm and greater.

EXAMPLE 3

This example demonstrates the effect of changes in the ratio of support material to matrix in accordance with the invention. Two catalysts were prepared, Catalysts K and L, using a SAPO-11 molecular sieve, wherein catalyst K contained 25 wt % of the molecular sieve and Catalyst L contained 50 wt % of the molecular sieve. The SAPO-11 composition was 0.12 SiO$_2$:Al$_2$O$_3$:P$_2$O$_5$. Both catalysts were prepared according to the procedure of Example 1 to contain 2000 ppm of Pd and 2000 ppm of Ni based on total weight of SAPO-11. Both catalysts were used under varying conditions for the hydroisomerization of n-octane. The results of these treatments are set forth below in Tables 3 and 4.

TABLE 3

| T °C. | P psig | LSHV h$^{-1}$ | Feed flow point °C. | Feed S (ppm) | Feed N (ppm) | Prod visc index | Prod flow pt. °C. |
|---|---|---|---|---|---|---|---|
| 370 | 1200 | 0.6 | +45 | 190 | 61 | 102 | –3 |
| 380 | 1200 | 0.6 | +45 | 190 | 61 | 100 | –12 |
| 380 | 400 | 1 | +45 | 190 | 61 | 98 | –30 |

TABLE 4

| T °C. | P psig | LSHV h$^{-1}$ | Feed flow point °C. | Feed S (ppm) | Feed N (ppm) | Prod visc index | Prod flow pt. °C. |
|---|---|---|---|---|---|---|---|
| 370 | 1200 | 0.6 | +45 | 190 | 1 | 119 | +3 |
| 370 | 400 | 0.6 | +45 | 190 | 1 | 119 | –3 |
| 380 | 400 | 1 | +45 | 190 | 1 | 115 | –9 |

As shown in Tables 3 and 4, the catalyst of the present invention exhibited excellent isomerization of the n-paraffin feedstock in the presence of sulfur and nitrogen, allowed a viscosity index of 119 to be obtained, and decreased the flow point of the product.

Thus provided is a catalyst system in accordance with the present invention which provides excellent hydroisomerization activity as well as improved HDS and HDN properties and resistance to deactivation from sulfur and nitrogen contaminants in the feedstock. Further provided is a method for preparing the catalyst system according to the invention and a process for treating a wide variety of hydrocarbon feedstocks with a catalyst system of the present invention so as to provide desired final products having increased fractions of isomers and decreased sulfur and nitrogen content.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A catalyst system for treating sulfur and nitrogen contaminated hydrocarbon feedstock, comprising:
    a matrix selected from the group consisting of alumina, silica alumina, titanium alumina and mixtures thereof;
    at least one support medium substantially uniformly distributed through said matrix and comprising a silica alumina molecular sieve material having a composition $xSiO_2:Al_2O_3:yP_2O_5$ wherein x is at least about 0.1;
    a first catalytically active metal phase supported on said support medium, said first catalytically active metal phase comprising a first metal selected from the group consisting of nickel, cobalt, iron and mixtures thereof and a second metal selected from the group consisting of palladium, platinum, ruthenium, rhodium and mixtures thereof; and
    a second catalytically active metal phase supported on said matrix, said second catalytically active metal phase comprising a third metal selected from the group consisting of nickel, cobalt, iron and mixtures thereof; a fourth metal selected from the group consisting of palladium, platinum, ruthenium, rhodium and mixtures thereof and a fifth metal selected from the group consisting of tungsten, molybdenum and mixtures thereof.

2. A catalyst system according to claim 1, wherein x is between about 0.1 to about 0.6 and y is between about 1.0 to about 0.9.

3. A catalyst system according to claim 1, wherein said first catalytically active metal phase and said second catalytically active metal phase are present in said catalyst system in an amount between about 1,000 ppm to about 10,000 ppm by weight with respect to the zeolite.

4. A catalyst system according to claim 1, wherein said first catalytically active metal phase further includes a sixth metal selected from group VIb of the Periodic Table of Elements.

5. A catalyst system according to claim 1, wherein said matrix is catalytically active.

6. A catalyst system according to claim 1, wherein said matrix is gamma alumina.

7. A catalyst system according to claim 6, wherein said gamma alumina has a surface area of between about 200 $m^2/g$ to about 400 $m^2/g$ and a pore volume of between about 0.3 cc/g to about 0.9 cc/g.

8. A catalyst system according to claim 1, wherein said support medium comprises a first molecular sieve material and a second molecular sieve material, each substantially uniformly distributed through said matrix, and wherein said first molecular sieve material and said second molecular sieve material have different average pore sizes.

9. A catalyst system according to claim 1, wherein said molecular sieve material has an average pore size of between about 5 Å to about 8 Å, and a surface area greater than or equal to about 200 $m^2/g$.

10. A catalyst system according to claim 1, wherein said silica alumina molecular sieve material is selected from the group consisting of SAPO-11, SAPO-37, SAPO-5 and mixtures thereof.

11. A catalyst system according to claim 1, wherein said at least one support medium and said matrix are present in a ratio by weight of support medium to matrix of between about 0.1 to about 0.7.

12. A catalyst system according to claim 1, wherein said first metal and said second metal are present in said first catalytically active metal phase in a weight ratio of said first metal to said second metal of between about 1:0.2 to about 4:1.

13. A catalyst system, according to claim 12, wherein said second metal is present in said first catalytically active metal phase in an amount of between about 0.025% to about 1.0% by weight of said support medium.

14. A catalyst system according to claim 1, wherein said first catalytically active metal phase further includes a sixth metal selected from the group consisting of tungsten, molybdenum and mixtures thereof.

15. A catalyst system according to claim 1, wherein said third metal and said fourth metal are present in said second catalytically active metal phase in a weight ratio of said third metal to said fourth metal of between about 1:0.2 to about 4:1.

16. A catalyst system, according to claim 15, wherein said fourth metal is present in said second catalytically active metal phase in an amount of between about 0.025% to about 1.0% by weight of said matrix.

17. A catalyst system according to claim 1, wherein said fifth metal is present in said second catalytically active metal phase in an amount of between about 6% to about 30% by weight of said matrix.

18. A catalyst system according to claim 1, wherein said catalyst system has a surface area of between about 200 $m^2/g$ to about 500 $m^2/g$ and an average pore diameter of between about 30 Å to about 80 Å.

19. A catalyst system according to claim 1, wherein said catalyst system has a mechanical resistance of between about 5 $kg/cm^2$ to about 13 $kg/cm^2$.

20. A method for preparing a catalyst system for treatment of a sulfur and nitrogen contaminated hydrocarbon feedstock, comprising the steps of:
    providing a matrix material selected from the group consisting of alumina, silica alumina, titanium alumina and mixtures thereof;
    providing at least one support medium comprising a silica alumina molecular sieve material having a composition $xSiO_2:Al_2O_3:yP_2O_5$ wherein x is at least about 0.1;
    impregnating said support medium with a first metal selected from the group consisting of nickel, cobalt, iron and mixtures thereof and a second metal selected from the group consisting of palladium, platinum, ruthenium, rhodium and mixtures thereof;
    mixing said impregnated support medium with said matrix so as to provide a substantially uniform heterogeneous mixture of said matrix and said impregnated support medium;
    forming said mixture into catalyst elements;
    impregnating said catalyst elements with a metal selected from group VIb of the Periodic Table of Elements;

impregnating said catalyst elements with a third metal selected from the group consisting of nickel, cobalt, iron and mixtures thereof; and a fourth metal selected from the group consisting of palladium, platinum, ruthenium, rhodium and mixtures thereof; and drying and calcining said impregnated catalyst elements so as to provide said catalyst system having a surface area of between about 200 $m^2/g$ to about 500 $m^2/g$ and a mechanical resistance of between about 5 $kg/cm^2$ to about 13 $kg/cm^2$.

21. A method according to claim 20, wherein said step of providing said at least one support medium comprises providing said silica alumina molecular sieve material having a silica/alumina ratio of between about 20 to about 200.

22. A method according to claim 20, further comprising providing said first catalytically active metal phase and said second catalytically active metal phase in said catalyst system in an amount between about 500 ppm to about 7000 ppm based on weight of said catalyst system.

23. A method according to claim 20, further comprising the step of drying said impregnated support medium at a temperature of less than or equal to about 150° C. prior to mixing with said matrix.

24. A method according to claim 20, further comprising the steps of drying and calcining said catalyst elements prior to impregnating with said metal selected from group VIb.

25. A method according to claim 24, wherein said drying step is carried out at room temperature.

26. A method according to claim 24, wherein said drying and calcining steps comprise the steps of drying said catalyst elements at a temperature of less than or equal to about 130° C. so as to provide dried catalyst elements, and calcining said dried catalyst elements by increasing temperature stepwise to a value of between about 420° C. to about 520° C.

27. A method according to claim 20, further comprising the step of drying said catalyst elements after impregnating with said metal selected from group VIb and prior to impregnating with said third metal and said fourth metal.

28. A method according to claim 27, wherein said step of drying said catalyst elements is carried out at a temperature of less than or equal to about 150° C.

29. A method according to claim 20, wherein said drying and calcining steps comprise the steps of drying said impregnated catalyst elements at a temperature of less than or equal to about 130° C. so as to provide dried impregnated catalyst elements, and calcining said dried impregnated catalyst elements by increasing temperature stepwise to a value of between about 420° C. to about 520° C.

30. A method according to claim 20, wherein said matrix is gamma alumina.

31. A method according to claim 20, wherein said gamma alumina has a surface area of between about 200 $m^2/g$ to about 400 $m^2/g$ and a pore volume of between about 0.3 cc/g to about 0.9 cc/g.

32. A method according to claim 20, wherein said matrix has a surface area of between about 200 $m^2/g$ to about 400 $m^2/g$.

33. A method according to claim 20, wherein said matrix is catalytically active.

34. A method according to claim 20, wherein said step of providing said at least one support medium comprises providing a first molecular sieve material and a second molecular sieve material wherein said first molecular sieve material and said second molecular sieve material have different average pore sizes.

35. A method according to claim 20, wherein x is between about 0.1 to about 0.6 and y is between about 1.0 to about 0.9.

36. A method according to claim 20, wherein said molecular sieve material is selected from the group consisting of SAPO-11, SAPO-37, SAPO-5 and mixtures thereof.

37. A method according to claim 20, wherein said at least one support medium and said matrix are provided in a ratio by weight of support medium to matrix of between about 0.1 to about 0.7.

38. A method according to claim 20, wherein said first metal and said second metal are provided in a weight ratio of said first metal to said second metal of between about 1:1 to about 4:1.

39. A method according to claim 20, wherein said third metal and said fourth metal are present in a weight ratio of said third metal to said fourth metal of between about 1:2 to about 4:1.

40. A method according to claim 20, wherein said catalyst system has an average pore diameter of between about 30 Å to about 80 Å.

41. A method according to claim 20, further comprising the step of mixing a binder with said at least one support medium at a ratio by weight of said support medium to said binder of between about 20 to about 100.

42. A method according to claim 41, wherein said binder is selected from the group consisting of acetic acid, glycolic acid and mixtures thereof.

43. A method according to claim 20, wherein said impregnating steps are carried out by impregnating with solutions of water soluble metal salts.

44. A method according to claim 43, wherein said water soluble salts are selected from the group consisting of acetates, nitrates, oxalates, chlorides and mixtures thereof.

45. A method according to claim 20, wherein said step of impregnating with said group VIb metal comprises impregnating said catalyst elements by ion exchange with a water soluble salt of said group VIb metal.

46. A method according to claim 45, wherein said water soluble salt is selected from the group consisting of acetates, nitrates, oxalates, chlorides and mixtures thereof.

47. A method according to claim 20, wherein said step of impregnating said at least one support medium with said first metal and said second metal comprises coimpregnating said support medium with said first metal and said second metal.

48. A method according to claim 20, wherein said step of impregnating said catalyst elements with said third metal and said fourth metal comprises coimpregnating said catalyst elements with said third metal and said fourth metal.

49. A method according to claim 20, wherein said step of forming said catalyst elements comprises extruding said mixture so as to provide extruded catalyst elements.

* * * * *